(12) United States Patent
Morton

(10) Patent No.: US 11,125,223 B2
(45) Date of Patent: Sep. 21, 2021

(54) RECIPROCATING MACHINE WITH CYLINDER HAVING COLLECTOR GROOVE

(71) Applicants: VOLVO TRUCK CORPORATION, Gothenburg (SE); Richard Kellogg Morton, Hagerstown, MD (US)

(72) Inventor: Richard Kellogg Morton, Hagerstown, MD (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 15/512,560

(22) PCT Filed: Sep. 29, 2014

(86) PCT No.: PCT/US2014/058106
§ 371 (c)(1),
(2) Date: Mar. 19, 2017

(87) PCT Pub. No.: WO2016/053255
PCT Pub. Date: Apr. 7, 2016

(65) Prior Publication Data
US 2017/0204842 A1    Jul. 20, 2017

(51) Int. Cl.
*F04B 39/02*    (2006.01)
*F01M 11/04*    (2006.01)
(Continued)

(52) U.S. Cl.
CPC .......... *F04B 39/0292* (2013.01); *F01M 11/02* (2013.01); *F01M 11/04* (2013.01);
(Continued)

(58) Field of Classification Search
CPC ... F04B 39/0292; F01M 13/023; F01M 11/02; F01M 2011/022; F02F 1/20; F16N 31/00
(Continued)

(56) References Cited

U.S. PATENT DOCUMENTS 872,786 A * 12/1907 Beazell
934,125 A *  9/1909 Young
(Continued)

FOREIGN PATENT DOCUMENTS

CN       1076992 A     10/1993
CN     102278163 A     12/2011
(Continued)

OTHER PUBLICATIONS

McDermott et al, "The Ideal Gas Law", from "Tutorials in Introductory Physics" at the University of Washington, pp. 1-7. (Year: 2014).*
(Continued)

*Primary Examiner* — Charles G Freay
(74) *Attorney, Agent, or Firm* — WRB-IP LLP

(57) ABSTRACT

A reciprocating machine incltides a cylinder including an internal cylinder wail, a piston movable in the cylinder between a top position and a. bottom position, the piston, comprising an upper ring pack and a lower ring pack disposed around a circumference of the piston and spaced from each other by a first distance, and a circumferential collector groove in the cylinder wall in a position that is above the lower ring pack when the piston is in the top position and that is below the upper ring pack when the piston is in the bottom position, the collector groove including at least" one hole eonneciabie to a conduit for comiecj-ion to a sump. A helical groove can also be provided in the cylinder wall.

19 Claims, 4 Drawing Sheets

(51) Int. Cl.
  *F04B 53/14* (2006.01)
  *F16N 31/00* (2006.01)
  *F04B 53/16* (2006.01)
  *F04B 53/04* (2006.01)
  *F01M 11/02* (2006.01)
  *F01M 13/02* (2006.01)
  *F02F 1/20* (2006.01)

(52) U.S. Cl.
  CPC ............ *F01M 13/023* (2013.01); *F02F 1/20* (2013.01); *F04B 53/04* (2013.01); *F04B 53/143* (2013.01); *F04B 53/164* (2013.01); *F16N 31/00* (2013.01); *F01M 2011/022* (2013.01); *F01M 2011/023* (2013.01)

(58) Field of Classification Search
  USPC ...................................... 184/6.8, 6.5, 26–36
  See application file for complete search history.

(56) References Cited

U.S. PATENT DOCUMENTS

| | | | | |
|---|---|---|---|---|
| 1,328,474 | A * | 1/1920 | Astrom | F04B 53/164 417/566 |
| 2,292,662 | A | 3/1942 | Sanders | |
| 3,181,833 | A | 5/1965 | Adams et al. | |
| 3,849,032 | A * | 11/1974 | Mulvey | F04B 1/00 417/454 |
| 3,851,631 | A | 12/1974 | Kiekhaefer | |
| 3,941,223 | A * | 3/1976 | Murakami | B60T 11/103 137/625.17 |
| 3,957,313 | A * | 5/1976 | Doversberger | B60T 13/44 303/2 |
| 3,972,396 | A * | 8/1976 | Bochnak | B64C 27/51 188/312 |
| 4,381,179 | A * | 4/1983 | Pareja | F04B 9/045 417/273 |
| 4,508,019 | A * | 4/1985 | Kabele | F16J 1/18 92/158 |
| 4,583,920 | A * | 4/1986 | Lindner | F04B 43/0733 417/266 |
| 4,824,342 | A * | 4/1989 | Buck | F04B 53/1032 417/503 |
| 4,904,026 | A * | 2/1990 | Bernhardt | B60T 8/4004 303/10 |
| 5,076,150 | A * | 12/1991 | Wehber | F16J 9/00 92/248 |
| 5,107,960 | A * | 4/1992 | Below | F01M 13/00 184/25 |
| 5,251,915 | A | 10/1993 | Meernik | |
| 6,220,214 | B1 | 4/2001 | Kojima et al. | |

FOREIGN PATENT DOCUMENTS

| | | | |
|---|---|---|---|
| DE | 644004 | A | 4/1937 |
| DE | 1503387 | * | 5/1969 |
| DE | 102008010286 | A1 * | 8/2009 |
| EP | 2199549 | A1 | 6/2010 |
| EP | 2339166 | A1 | 6/2011 |
| EP | 2746553 | A1 | 6/2014 |
| FR | 587207 | * | 4/1925 |
| GB | 678084 | A | 8/1952 |
| JP | H02308915 | A | 12/1990 |
| JP | 2002267016 | A | 9/2002 |
| JP | 2007132247 | A | 5/2007 |

OTHER PUBLICATIONS

International Search Report (dated Feb. 18, 2015) for corresponding International App. PCT/US2014/058106.
International Preliminary Report on Patentability (dated Oct. 4, 2016) for corresponding International App. PCT/US2014/058106.
European Search Report (dated May 7, 2018) for corresponding European App. EP 14903339.
Chinese Official Action (dated Nov. 1, 2018) for corresponding Chinese App. 201480082307.9.
Chinese Official Action (dated Jul. 11, 2019) for corresponding Chinese App. 201480082307.9.

\* cited by examiner

RECIPROCATING MACHINE WITH CYLINDER HAVING COLLECTOR GROOVE

BACKGROUND AND SUMMARY

The present invention relates generally to reciprocating machines with cylinders and, more particularly, to groove patterns provided in cylinder walls.

Certain reciprocating machines are comprised of a slider-crank mechanism, where the slider is a piston that moves in and out of a closed cylinder. The piston is typically a close fit to the cylinder, often uses rings or other devices to seal a working fluid in one end of the cylinder. The contacting portions of the piston (or rings or sealing devices) and the cylinder are typically lubricated with oil or other lubricating fluid. Common machines of this type include reciprocating internal combustion engines, air and gas compressors, and hydraulic and pneumatic cylinders. In many cases, it is strongly desirable to minimize the amount off lubricant that passes the piston into the working fluid, and there are many techniques applied to do this.

Most reciprocating machines are configured so that the crank mechanism is at or below the cylinder axis, so that excessive lubricant tends to drain into the crankcase, particularly when the machine is not running. However, in certain applications, it is desirable to orient the machine so that the cylinder axis is oriented downward relative to the crank. In these cases, any excess oil may run down the cylinder wall, past any piston sealing features or devices, into the closed end of the cylinder.

It is desirable to provide a means to minimize the amount of liquid lubricant that might escape past piston sealing features and puddle in the working end of a cylinder when the cylinders are inverted, or oriented downward relative to the crankcase.

According to an aspect of the present invention, a reciprocating machine includes a cylinder including an internal cylinder wall, a piston movable in the cylinder between a top position and a bottom position, the piston comprising an upper ring pack and a lower ring pack disposed around a circumference of the piston and spaced from each other by a first distance, and a circumferential collector groove in the cylinder wall in a position that is above the lower ring pack when the piston is in the top position and that is below the upper ring pack when the piston is in the bottom position, the collector groove including at least one hole connectable to a conduit for connection to a sump.

According to another aspect of the present invention, a reciprocating machine comprises a cylinder comprising an internal cylinder wall, a piston movable in the cylinder between a top position and a bottom position, the piston comprising an upper ring pack and a lower ring pack disposed around a circumference of the piston and spaced from each other by a first distance, and a double helix groove in the cylinder wall, each helix of the double helix intersecting with the other helix of the double helix at a top end that is above the lower ring pack when the piston is in the top position and that is below the upper ring pack when the piston is in the bottom position.

According to yet another aspect of the present invention, a reciprocating machine comprises a cylinder comprising an internal cylinder wall, a piston movable in the cylinder between a top position and a bottom position, wherein the cylinder is oriented so that the top position is disposed vertically below the bottom position, and a circumferential collector groove in the cylinder wall, the collector groove including at least one hole connectable to a conduit for connection to a sump.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
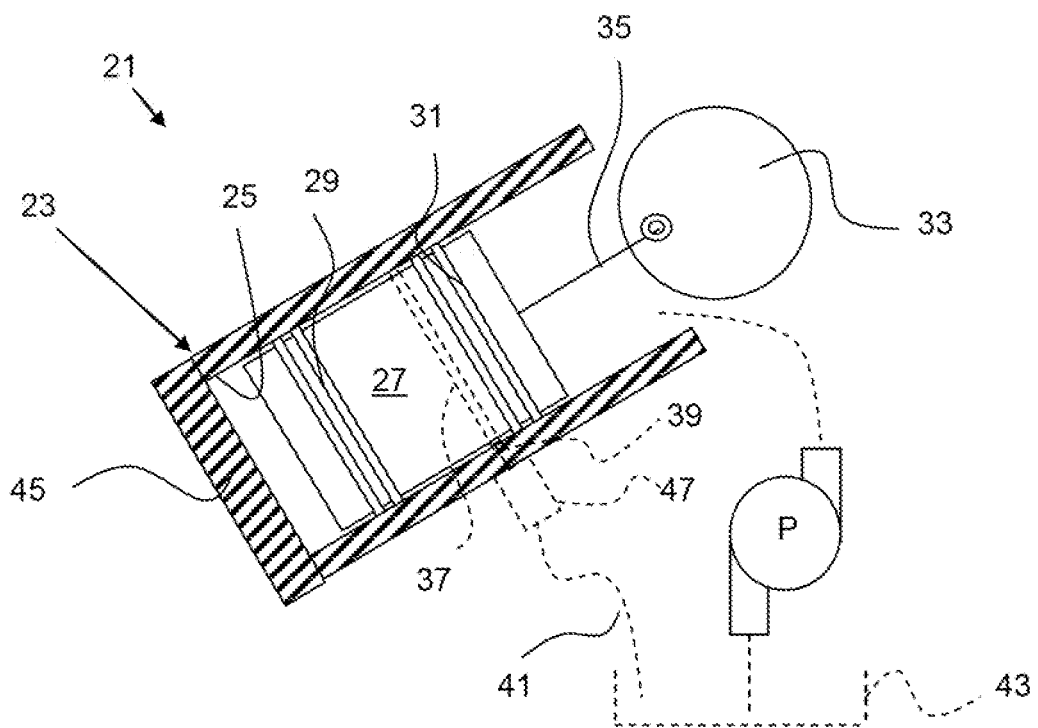
FIGS. 1A and 1B are schematic, cross-sectional views of an engine according to an aspect of the present invention with a piston in a top dead center position and a bottom dead center position, respectively.
Figure 1B:
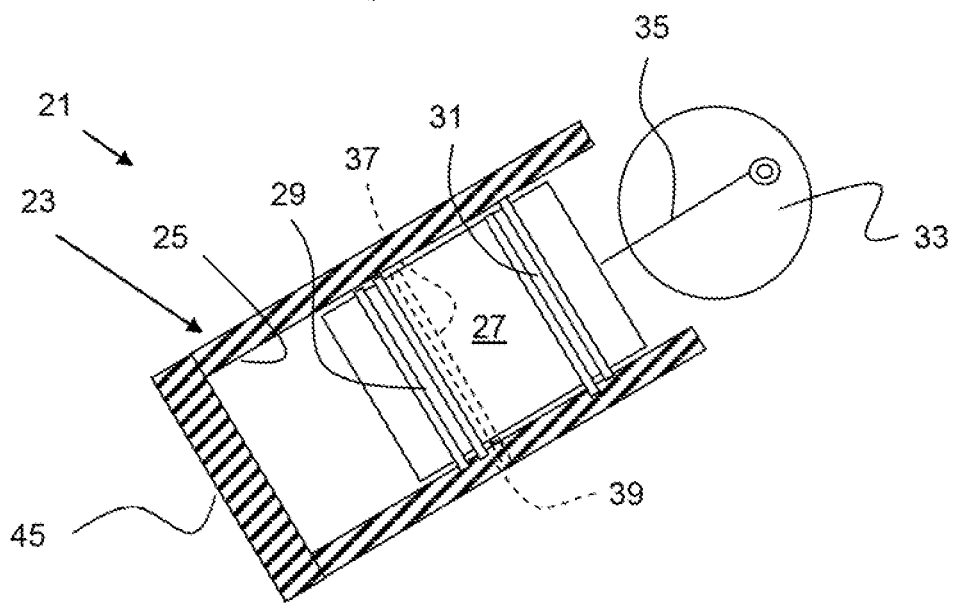

A reciprocating machine in the form of an engine 21 according to an aspect of the present invention is seen in FIGS. 1A and 1B and comprises a cylinder 23 comprising an internal cylinder wall 25. A piston 27 is movable in the cylinder 23 between a top position (FIG. 1A) ("top dead center" or "TDC") and a bottom position (FIG. 1B) ("bottom dead center" or "BDC"). The piston 27 comprises an upper ring pack 29 and a lower ring pack 31 disposed around a circumference of the piston and spaced from each other by a first distance D1. The piston 27 is linked to a crank 33 by a piston rod 35 and drives the crank as it moves back and forth between TDC and BDC.

A circumferential collector groove 37 is provided in the cylinder wall 25 in a position that is above the lower ring pack 31 when the piston is at TDC and that is below the upper ring pack 29 when the piston is at BDC. In this way, the upper ring pack 29 and lower ring pack 31 will not make harmful contact with the collector groove as the piston 27 moves between TDC and BDC.

The collector groove 37 includes at least one hole 39 (shown in phantom in FIG. 1A) connectable to a conduit 41 (shown in phantom in FIG. 1A) for connection to a sump 43 (shown in phantom in FIG. 1A). Lubricant (usually oil) can collect in the collector groove 37, rather than toward the cylinder head 45, and be directed to the sump 43. A pump P can be provided for returning the lubricant to a crankcase (not shown). The terms "above" and "below" are understood to be in relation to closeness to TDC or BDC or position relative to the cylinder head 45. The present invention has particular application to reciprocating machines with cylinders that have TDC even with or vertically below BDC, i.e., the head 45 of the cylinder 23 is at a bottom of the cylinder.

The collector groove 37 can be perpendicular to a central axis A of the cylinder as seen in FIGS. 1A-2B, canted at an angle to the perpendicular, or can have some other shape, such as a wave shape (shown in phantom in FIG. 2A) having one or more periods, i.e., at least one crest 37C closest to TDC and a trough 37T closest to BDC. At least one hole 39 will typically be disposed at what is expected to be a vertically lowest portion of the collector groove 37 to facilitate drainage from the cylinder 23.

Figure 3:
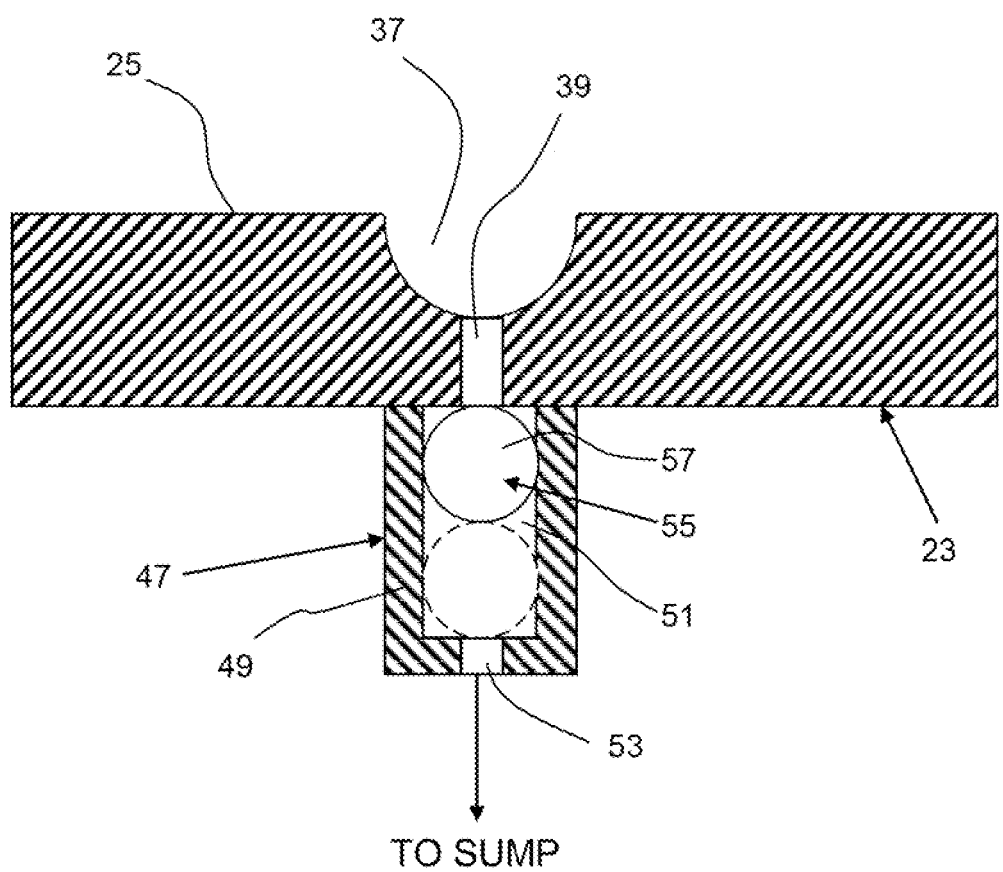
FIG. 3 is a schematic, cross-sectional view of a portion of a cylinder for an engine according to another aspect of the present invention and showing an embodiment of a blow-by control valve according to an aspect of the present invention.
Figure 4:
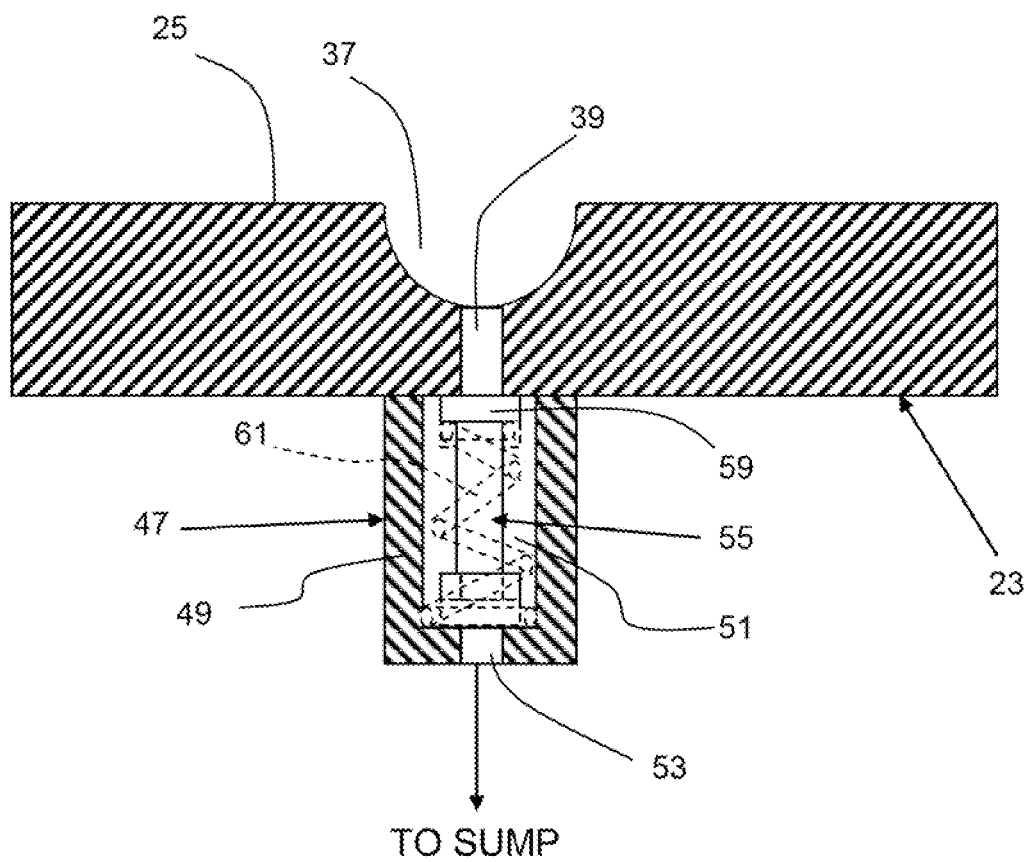
FIG. 4 is a schematic, cross-sectional view of a portion of a cylinder for an engine according to another aspect of the present invention and showing another embodiment of a blow-by control valve according to another aspect of the present invention.

As seen in phantom in FIG. 1A, a blow-by control valve 47 can be attached to the at least one hole 39. As seen in FIG. 3, the control valve 47 can comprise walls 49 defining a chamber 51 having an opening 53 and a closure member 55 arranged to open the hole 39 and close the opening when pressure in the cylinder is above a first pressure and to close the hole and open the opening when pressure in the cylinder is below a second pressure. The chamber 51 will ordinarily have a volume sufficient to retain any lubricant that might be expected to enter the chamber during a pressure cycle. The closure member 55 can take a variety of suitable forms such as a ball 57 as seen in FIG. 3, or a plunger 59 as seen in FIG. 4. The closure member 55 may be spring loaded to close the close the hole 39 (an illustrative form of spring 61 is shown in phantom in FIG. 4, and could also be used in the embodiment shown in FIG. 3). The blow-by control valve 47 can facilitate avoiding excessive release of pressure from the cylinder 23 while also permitting lubricant that collects in the collector groove 37 to drain from the cylinder rather than flow toward the interior of the cylinder, toward the head 45 of the cylinder.

Figure 2A:
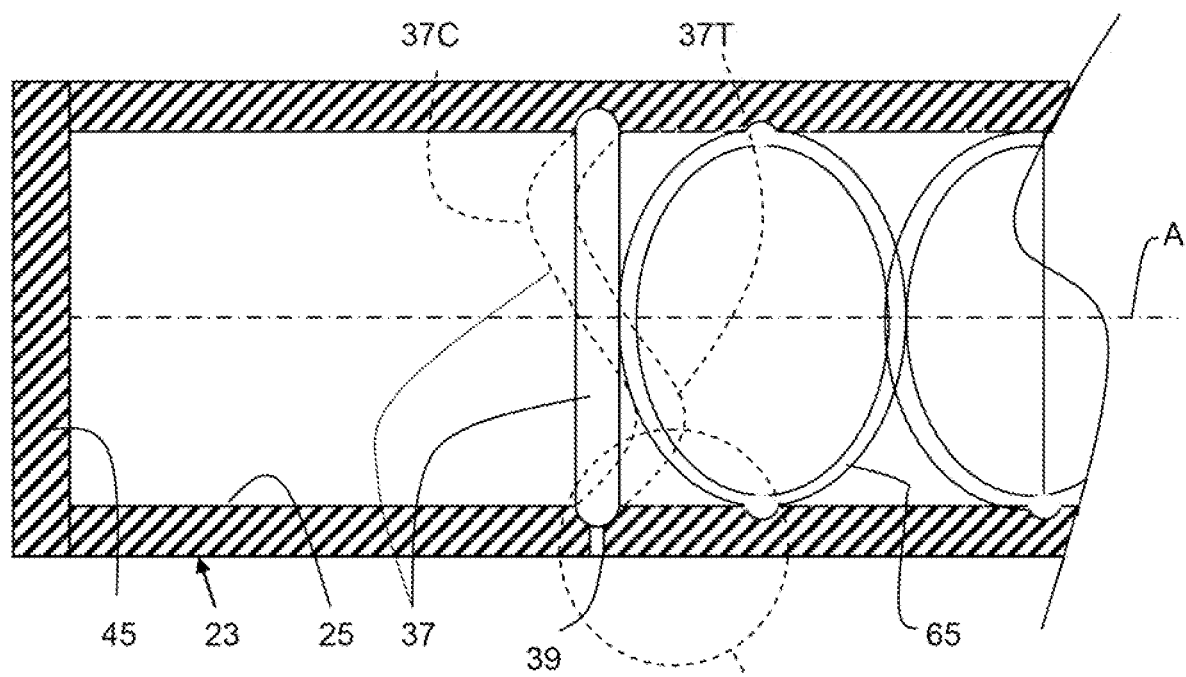
FIG. 2A is a schematic, cross-sectional view of a portion of a cylinder for an engine according to an aspect of the present invention.
Figure 2B:
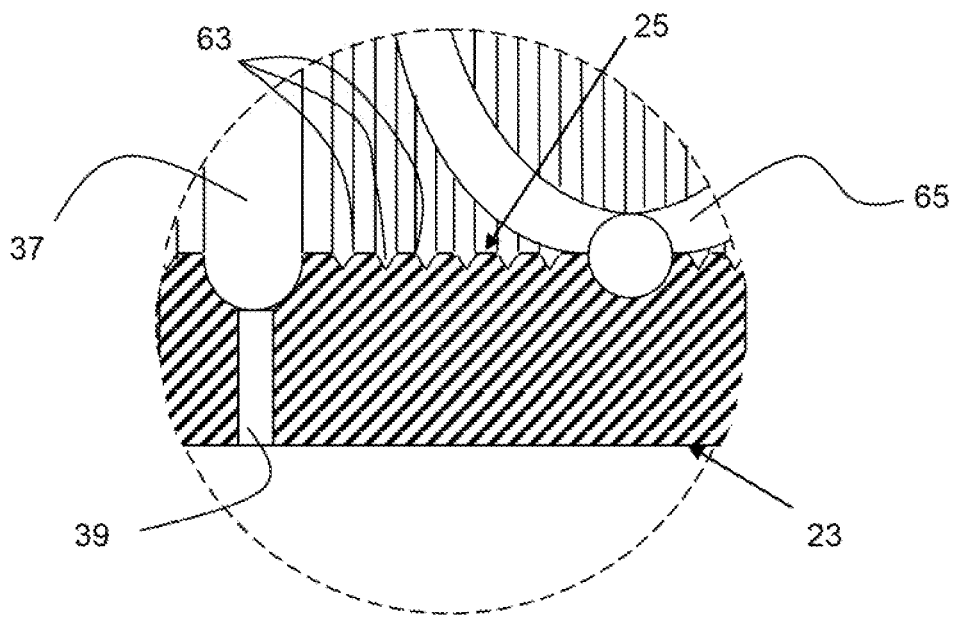
FIG. 2B is an enlargement of a portion of the cylinder of FIG. 2A.

The collector groove 37 will ordinarily be substantially a half circle in cross-section, although other shapes may be provided, such as V-shapes or rectangular shapes. As seen in FIG. 2B, the cylinder 23 may comprise a plurality of honing grooves 63. The collector groove 37 is substantially larger than the honing grooves 63. In current internal combustion engines, honing depth is typically a few microns, usually less than 10 microns. It is presently contemplated that the collector groove 37 will be between about 100 microns up to about 1 mm (1000 microns), i.e., 1-2 orders of magnitude larger than the honing grooves.

A helical groove 65 or grooves can also be provided in the wall 25 of the cylinder 23. The helical groove 65 will ordinarily not extend toward TDC beyond the collector groove 37, and ordinarily intersects with the collector groove. The collector groove 37 will typically be larger than the helical groove 65. As seen in FIG. 2A, a helical groove 65 may be in the form of a double helix with helices that reverse direction where they intersect the collector groove 37, i.e., each helix of the double helix intersects with the other helix of the double helix at a top end of the double helix, so that there is no net turning force on the piston as it passes over them. The helical groove 65 can guide excessive lubricant in the outer part of the cylinder (i.e., the portion toward the crankcase or BDC) to the collector groove 37 and prevent the piston rings of the upper ring pack 29 or lower ring pack 31 from pushing lubricant into the inner portion of the cylinder (i.e., the portion toward the head 45 or TDC).

Though the present invention has primarily been described in conjunction with its application in an internal combustion engine, it will be appreciated that the invention has application in other forms of reciprocating machines, such as air and gas compressors and hydraulic and pneumatic cylinders.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A reciprocating machine, comprising:
   a cylinder comprising an internal cylinder wall;
   a sump for collecting oil;
   a pump for pumping oil from the sump to the cylinder;
   a piston movable in the cylinder between a top position and a bottom position, the piston comprising an upper ring pack and a lower ring pack disposed around a circumference of the piston, movable with the piston, and spaced from each other by a first distance; and
   a circumferential collector groove in the cylinder wall in a position that is above the lower ring pack when the piston is in the top position and that is below the upper ring pack when the piston is in the bottom position, the collector groove including at least one hole connected to a conduit connected to the sump configured for returning oil from the collector groove to the sump, wherein the collector groove defines a wave shape having at least one crest closest to a top position of the piston in the cylinder and a trough closest to the bottom position of the piston in the cylinder.

2. The reciprocating machine as set forth in claim 1, wherein the collector groove is perpendicular to a central axis of the cylinder.

3. The reciprocating machine as set forth in claim 1, comprising a blow-by control valve attached to the at least one hole, the control valve comprising a chamber having an opening and a closure member arranged to open the hole and close the opening when pressure in the cylinder is above a first pressure and to close the hole and open the opening when pressure in the cylinder is below a second pressure level.

4. The reciprocating machine as set forth in claim 3, wherein the closure member comprises a ball.

5. The reciprocating machine as set forth in claim 3, wherein the closure member comprises a plunger.

6. The reciprocating machine as set forth in claim 3, wherein the closure member is spring loaded to close the hole.

7. The reciprocating machine as set forth in claim 1, wherein the collector groove is substantially a half circle in cross-section.

8. The reciprocating machine as set forth in claim 1, wherein the cylinder comprises a plurality of honing grooves, the collector groove being larger than the honing grooves.

9. The reciprocating machine as set forth in claim 1, wherein the cylinder is oriented so that the top position is disposed vertically below the bottom position.

10. The reciprocating machine as set forth in claim 1, comprising a helical groove in the cylinder wall intersecting with and below the collector groove.

11. The reciprocating machine as set forth in claim 10, wherein the helical groove is a double helix.

12. The reciprocating machine as set forth in claim 11, wherein each helix of the double helix intersects with the other helix of the double helix at a top end of the double helix.

13. The reciprocating machine as set forth in claim 12, where the top end is at the collector groove.

14. The reciprocating machine as set forth in claim 10, wherein the helical groove ends at the collector groove.

15. A reciprocating machine, comprising:
- a cylinder comprising an internal cylinder wall;
- a sump for collecting oil;
- a pump for pumping oil from the sump to the cylinder;
- a piston movable in the cylinder between a top position and a bottom position, the piston comprising an upper ring pack and a lower ring pack disposed around a circumference of the piston and spaced from each other by a first distance;
- a double helix groove in the cylinder wall, each helix of the double helix intersecting with the other helix of the double helix at a top end that is above the lower ring pack when the piston is in the top position and that is below the upper ring pack when the piston is in the bottom position; and
- a circumferential collector groove in the cylinder wall, the collector groove including at least one hole connected to a conduit connected to the sump configured for returning oil from the collector groove to the sump.

16. The reciprocating machine as set forth in claim 15, wherein the cylinder comprises a plurality of honing grooves, the helical groove being larger than the honing grooves.

17. The reciprocating machine as set forth in claim 15, wherein the cylinder is oriented so that the top position is disposed vertically below the bottom position.

18. The reciprocating machine as set forth in claim 15, wherein the collector groove is in a position that is above the lower ring pack when the piston is in the top position and that is below the upper ring pack when the piston is in the bottom position.

19. A reciprocating machine, comprising:
- a cylinder comprising an internal cylinder wall;
- a sump for collecting oil;
- a pump for pumping oil from the sump to the cylinder;
- a piston movable in the cylinder between a top position and a bottom position, wherein the cylinder is oriented so that the top position is disposed vertically below the bottom position;
- a circumferential collector groove in the cylinder wall between the top position and the bottom position, the collector groove including at least one hole connected to a conduit connected to the sump configured for returning oil from the collector groove to the sump; and
- a helical groove in the cylinder wall intersecting with and vertically above the collector groove.

* * * * *